3,376,200
VAPOUR QUALITY MEASUREMENT BY DELAYED GAMMA RADIATION EMISSION
Arthur G. Ward, Deep River, Ontario, Canada, assignor to Atomic Energy of Canada Limited, Ottawa, Ontario, Canada, a corporation of Canada
Filed Aug. 26, 1966, Ser. No. 575,419
7 Claims. (Cl. 176—19)

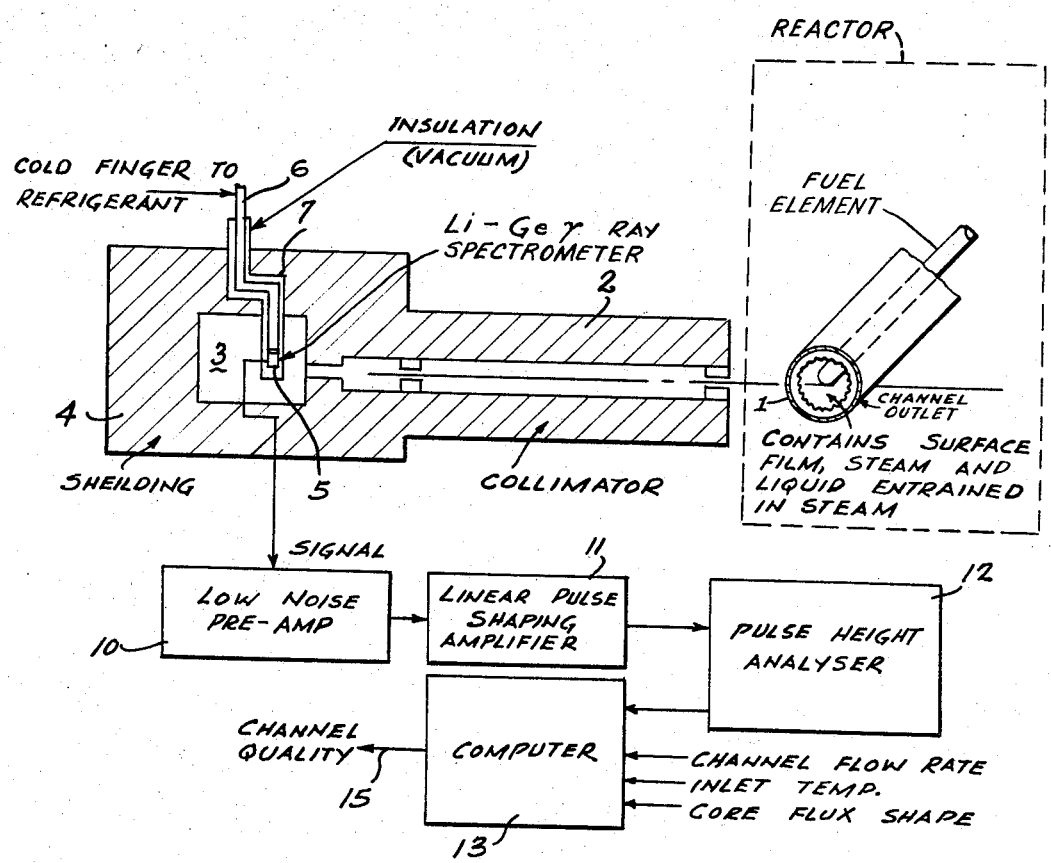

ABSTRACT OF THE DISCLOSURE

An apparatus for determining the quality of a coolant used in a nuclear reactor is described in which the coolant passes through the core of the reactor and is subjected to neutron irradiation. If the coolant contains a substance which undergoes delayed production of gamma radiation after the neutron bombardment, a detector past which the coolant is led after irradiation will detect the gamma radiation. The output from the detector is connected to a computer which calculates coolant quality on the basis of the signals from the detector and other chosen inputs dependent upon known conditions in the reactor.

---

This invention relates to a novel method and apparatus for measuring the quality of the fluid coolant from a nuclear reactor.

The measurement of the quality (i.e. the weight percent of vapour in a mixture of liquid and vapour) of the coolant leaving a reactor is difficult since it normally requires penetration of the tube containing the coolant, which in turn leads to interference with the flow and uncertainty that the sampled coolant is representative of the average quality (due to separation of vapour and liquid in the tube). Other measurement methods have been proposed the most suitable of which although it overcomes the problem of tube penetration requires the separate irradiation and detection of photons Compton scattered by the coolant.

In accordance with the present invention, a novel and accurate method of determining coolant quality has been developed, which does not require an independent irradiation source for the measurement.

More particularly in accordance with one aspect of the invention there is provided a nuclear reactor, comprising a core, means for receiving a fuel within said core for developing heat and a neutron flux therein, a once-through coolant channel passing through said core, means for passing evaporable fluid coolant into said channel for heating said coolant and subjecting said coolant to bombardment by said neutron flux, said coolant being a material which undergoes delayed production of γ-radiation upon subjection to said neutron bombardment, a detector sensitive to and producing signals dependent upon the intensity of said γ-radiation mounted adjacent said channel at a point at which said coolant has passed through said core, said signals produced by said detector being a measure of the density of said coolant at said point. The signals from the detector may be passed to a computer which also receives other chosen inputs for calculating coolant quality at the detection point. The reactor may include means sensitive to coolant flow rate and temperature at the inlet to the channel for feeding signals to the computer. When the coolant is oxygen-containing the detector is preferably sensitive to γ-radiation of about 6 mev. energy which is produced by decay of $N^{16}$.

In accordance with another aspect of the invention there is provided the method of determining the quality of an evaporable fluid coolant for a nuclear reactor, said coolant being chosen from materials which undergo delayed production of γ-radiation upon subjection to neutron bombardment which comprises the steps of, passing said coolant through the core of a nuclear reactor, said nuclear reactor core having a neutron flux therein, measuring the temperature of coolant entering said channel, detecting γ-radiation from coolant in said channel which has passed through said core at an energy of that produced by said delayed production, the γ-radiation intensity being proportional to intensity of said neutron flux, and calculating quality of said coolant from said measured flow rate, inlet temperature, and γ-radiation intensity.

To describe the invention, reference will be made to the accompanying drawing which shows a schematic diagram of a γ-ray detector adjacent to a coolant tube from a nuclear reactor.

Now the neutron flux in a reactor depends on the local heat production in the fuel, the enrichment of the fuel, and the arrangement of the materials. Further there is production of the isotope $N^{16}$ from any oxygen-containing coolant, such as ordinary water or heavy water or organic liquid, as it passes through the neutron flux in the reactor.

It can be shown that when a fast neutron encounters the nucleus of an $O^{16}$ atom, a nucleus of $N^{16}$ is often produced. The $N^{16}$ nucleus subsequently decays with a half-life of about 7 seconds, and in this decay a γ-ray of about 6 mev. is emitted. This γ-radiation will easily penetrate the walls of a coolant tube.

In following the teaching of the invention, the γ-radiation from the decay of $N^{16}$ atoms produced in the reactor core may be measured by a detector adjacent to a coolant tube or header from a nuclear reactor. The strength of signal detected will be dependent on (i) the rate of production of $N^{16}$ in the fluid, i.e. on the reactor core flux level and the transit time for the coolant fluid through the reactor; (ii) the transport time of $N^{16}$ containing fluid to the measurement site and (iii) the average coolant density in the portion of the coolant tube near the $N^{16}$ gamma ray detector.

The rate of production of $N^{16}$ in the coolant fluid is proportional to the local reactor power level, the transit time of the fluid through the core depends on the inlet flow and the means change in density of the coolant in traversing the core, which in turn depends on the heat transfer rate to the coolant; the transport time for the coolant fluid to the measurement site also depends on the mean density of the coolant from the reactor core.

Thus the $N^{16}$ γ-radiation measured by the detector depends in a complicated way on reactor power, inlet coolant flow, coolant temperature and pressure and their effect on $N^{16}$ production rates, residence time in the core, transit time to the detector and coolant density at the detector.

It can be seen, therefore, that although all of these factors are inter-related, the signal at the γ-radiation detector changes with changes in the quality of the coolant and gives a measure of quality in the coolant leaving the reactor.

The expected pattern of $N^{16}$ activity to be measured from the various coolant tubes through the reactor can be calculated from design values of coolant flow, temperature and pressure, and reactor geometry and power, and compared with the measured pattern. Disagreement with the measured pattern indicates anomalies. In many reactors, independent instrumentation will measure coolant channel inlet flow and temperature, and reactor power and power distribution in the core. The measurement of $N^{16}$ activity in the coolant leaving this reactor which, according to this invention, is particularly sensitive to the coolant quality in boiling reactors, since changes in density with quality are large, provides information necessary to assure that the reactor coolant system is functioning properly.

Most reactors are of the once-through type of vapour generator and use recirculated coolant. It is apparent that some $N^{16}$ activity will return to the inlet with the coolant. The short half-life of $N^{16}$ makes the recirculated activity small compared with that produced in the coolant during passage through the reactor. Appropriate allowance for this can be made in calculating the coolant quality from the measured $N^{16}$ activity in the outlet coolant channels.

An apparatus for performing the measurements described above on a pressure tube reactor cooled by boiling water is shown in the drawing. A channel outlet tube 1 contains the water coolant as a surface film, steam and entrained fluid. This tube, and other selected tubes, for the particular coolant channel concerned are scanned for $N^{16}$ activity by a Li-Ge γ-ray spectrometer. The collimator 2 allows γ-rays from a defined volume of the coolant to impinge on the γ-ray detector 5, which is contained in a cavity 3 within appropriate shielding 4. The detector 5 is cooled by a "finger" 6 which leads to a refrigerant source not shown, and is heat insulated by enclosing vacuum pipe 7. This detector develops an electrical charge output signal proportional to the energy of the γ-ray striking it. The signal from the detector is fed to a charge-sensitive amplifier 10, a pulse-shaping amplifier 11, and a pulse height analyser 12. Pulses of the height corresponding to $N^{16}$ γ-rays are detected by analyser 12 and fed to the computer 13.

In the computer 13 the counting rate of the $N^{16}$ activity from the coolant tube is used to calculate the quality of the coolant in the channel. For this calculation the computer requires estimated or measured values of channel flow, inlet, temperature, reactor geometry and core flux shape. The particular computer program depends on the input information available from the reactor and details of the reactor geometry.

The collimator 2 can be made to scan the various coolant tubes from each of the reactor pressure tubes and a quality determination for each channel outlet can be obtained.

I claim:
1. In a nuclear reactor, comprising a core, means for receiving a fuel within said core for developing heat and a neutron flux therein, a once-through coolant channel passing through said core, means for passing evaporable fluid coolant into said channel for heating said coolant and subjecting said coolant to bombardment by said neutron flux, said coolant being a material which undergoes delayed production of γ-radiation upon subjection to said neutron bombardment, a detector sensitive to and producing signals dependent upon the intensity of said γ-radiation mounted adjacent said channel at a point at which said coolant has passed through said core, a computer for said signals from said detector, means for feeding chosen inputs to said computer, means for connecting said computer to said detector, and means in said computer for calculating coolant quality at said point from said detector signals and said chosen inputs.

2. Apparatus as defined in claim 1, said chosen inputs including means for measuring rate of flow of coolant in said channel, means for measuring temperature of said coolant entering said channel, and means connecting said measuring means to said computer.

3. Apparatus as defined in claim 1 wherein said chosen inputs include signals representing geometry of said reactor and core flux shape in said reactor.

4. Apparatus as defined in claim 1 comprising means for selecting signals from said detector corresponding to said intercepted γ-radiation and means connecting said selecting means between said detector and said computer.

5. Apparatus as defined in claim 4 said coolant being oxygen-containing and said detector being sensitive to γ-radiation emitted by decay of $N^{16}$.

6. Apparatus as defined in claim 5, said detector being sensitive to γ-radiation of about 6 mev.

7. Apparatus as defined in claim 6, said detector producing pulses of a height dependent upon the energy of γ-radiation intercepted, a pulse height analyser connected to said detector, said analyser producing an output dependent upon intensity of pulses corresponding to γ-radiation of about 6 mev., a computer connected to said pulse height analyser, means for measuring rate of flow of coolant in said channel, means for measuring temperature of coolant entering said channel, means connecting said measuring means to said computer, and means in said computer for calculating coolant quality at said point from signals from said pulse height analyser and said measuring means.

References Cited
UNITED STATES PATENTS 3,165,446  1/1965  Untermyer _____ 176—19

FOREIGN PATENTS 859,209  1/1961  Great Britain.

OTHER REFERENCES

AEC-Document, AEC–tr–6402, 1964, pp. 1–9.

CARL D. QUARFORTH, *Primary Examiner.*

L. DEWAYNE RUTLEDGE, *Examiner.*

H. E. BEHREND, *Assistant Examiner.*